United States Patent [19]

Seah

[11] Patent Number: 4,676,934
[45] Date of Patent: Jun. 30, 1987

[54] STRUCTURED WV PACKING ELEMENTS

[75] Inventor: Alexander M. Seah, Irving, Tex.

[73] Assignee: Jaeger Products, Inc., Spring, Tex.

[21] Appl. No.: 781,249

[22] Filed: Sep. 27, 1985

[51] Int. Cl.$^4$ .............................................. B01F 3/04
[52] U.S. Cl. ..................................... 261/112; 55/241;
165/60; 202/158; 210/150; 422/224; 428/182;
428/597
[58] Field of Search .................................. 261/94-98,
261/112, DIG. 72, DIG. 11; 165/166, 60;
210/150, 151; 422/211, 224; 202/158; 55/240,
241; 428/182, 183, 596, 597; 29/157 R, 163.5 F,
163.5 R; 366/336, 337, 340

[56] References Cited

U.S. PATENT DOCUMENTS

| | | | |
|---|---|---|---|
| 1,618,279 | 2/1927 | Fedders | 428/597 X |
| 2,206,440 | 7/1940 | Walker | 261/112 |
| 3,262,682 | 7/1966 | Bredberg | 261/112 X |
| 4,276,242 | 6/1981 | Chen et al. | 428/597 X |
| 4,296,050 | 10/1981 | Meier | 261/DIG. 72 |
| 4,501,707 | 2/1985 | Buhlmann | 428/596 X |

FOREIGN PATENT DOCUMENTS

| | | | |
|---|---|---|---|
| 130745 | 1/1985 | European Pat. Off. | 261/DIG. 72 |
| 147213 | 4/1921 | United Kingdom | 261/95 |
| 843119 | 8/1960 | United Kingdom | 261/112 |

Primary Examiner—Richard L. Chiesa
Attorney, Agent, or Firm—Knobbe, Martens, Olson & Bear

[57] ABSTRACT

A packing element for use in an exchange column is provided. The packing element is of the type consisting of a plurality of corrugated plates placed adjacent to one another, with the corrugations of adjacent plates forming a criss-cross pattern. A plurality of regular linear arrays of "W"-shaped openings, alternating with linear arrays of "V"-shaped openings are formed in each plate. The locations of these openings or notches with respect to the corrugations are so arranged as to create liquid drip points and flow paths on the individual plates that improve the mixing and mass transfer characteristics of the packing element.

7 Claims, 8 Drawing Figures

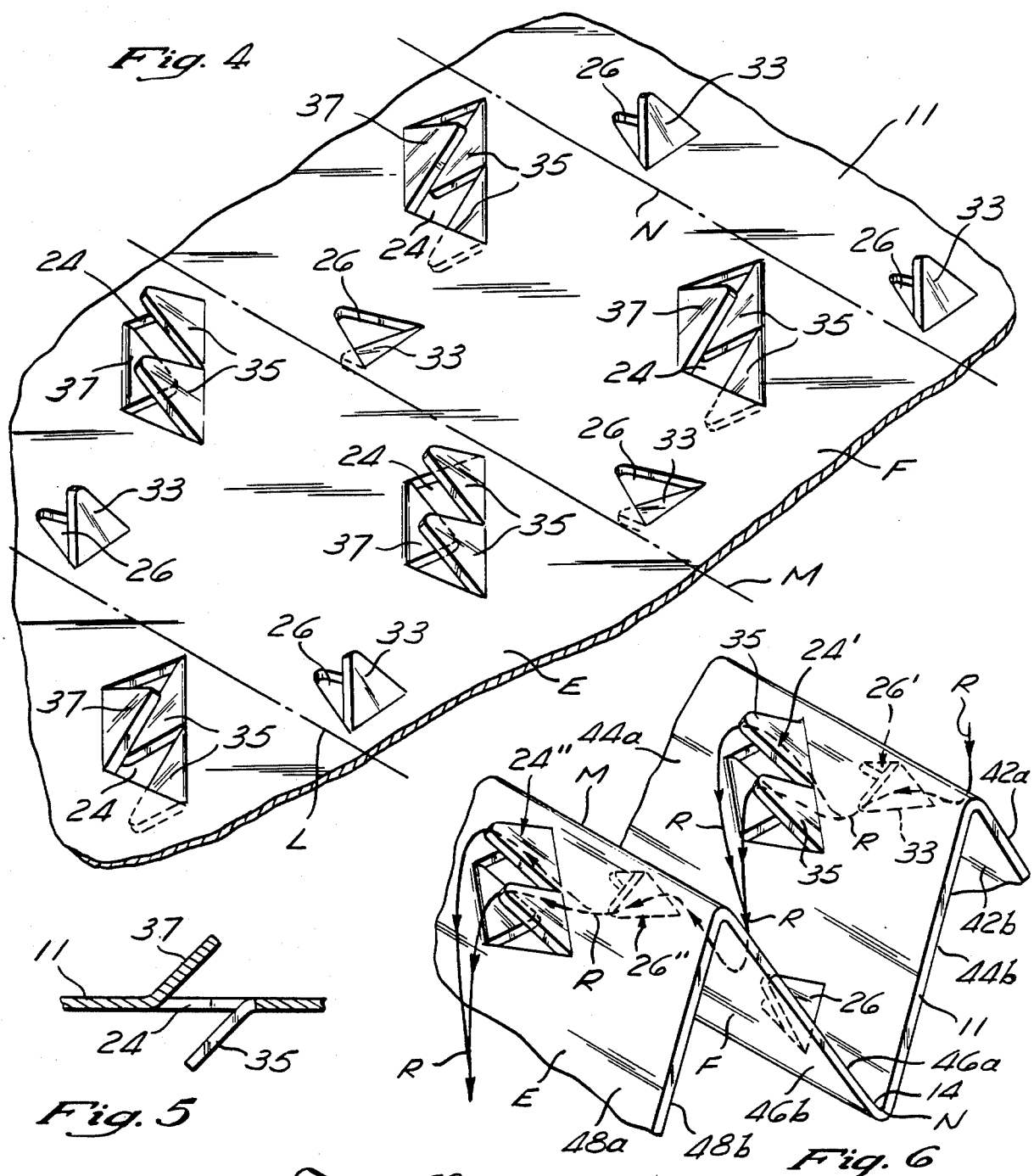

STRUCTURED WV PACKING ELEMENTS

BACKGROUND OF THE INVENTION

1. Field of the Invention

The present invention relates to a packing element for an exchange column, either mass transfer or heat exchange, and more particularly to such multiple-member packing elements consisting of a plurality of adjacent, parallel, corrugated plates, with the corrugations of adjacent plates abutting one another forming fluid-receiving channels therethrough.

2. Description of the Prior Art

Many commercial chemical processes rely on the mass and heat transfer advantages provided by packed columns. such processes can include distillation, absorption and desorption, gas cleaning and drying, and various biological processes, particularly forms of filtration. In the majority of cases, two fluids, normally a gas and a liquid, are intermingled within a column, typically as counter-current flow streams. The reaction rates for these chemical processes are directly proportional to the amount of effective surface area within the column or tower over which the two fluids can reactively interface with one another. Packing elements are placed in the towers to increase the amount of surface area available for such interfacing, and one type of packing element that has been used consists of a multi-layered construction of parallel, corrugated plates.

The plates are generally made of sheet metal and are placed in contact with one another such that the folds or corrugations are at an angle to the column or tower axis. The plates themselves are disposed in planes that are parallel to the tower axis, thus maximizing the flow rates of the two fluids through the corrugated plates. When placed in such an attitude, and because the individual plates are formed out of sheet metal, problems have been experienced in obtaining a uniform distribution of the liquid over the surface of the plate. This can be a severe disadvantage since uniform distribution is essential for an effective mass transfer or heat exchange process when utilizing a gas as one of the fluids.

A further disadvantage with the corrugated-plate packing elements has been the tendency of the liquid fluid to flow down the folds or corrugations instead of evenly coating the plate surface while flowing from fold to fold. This "channeling" significantly decreases the reactive surface area available to the other fluid, and simultaneously increases the rate of flow-through of the liquid. These two events have almost a synergistic effect with one another, magnifying the decrease in the amount of reactant products and product yield for the packed tower.

The structure taught by Bredberg, U.S. Pat. No. 3,262,682, respnds to these problems by providing liquid-absorbing, corrugated sheets in the packing element. The sheets are, to some extent, self-wetting upon the application of the liquid-phase material, In addition. the liquid-absorbing sheet also tends to reduce the run-off problems. Both of these same disadvantages of corrugated plate elements are also addressed in Meir, U.S. Pat. No. 4,296,050, by providing fine grooves and random apertures in the folded surfaces. The capillary action generated by the fine grooves (termed "fluting" in Meier), assists in the wetting of the element surfaces. The random holes also provide such a wetting effect by forcing the liquid to move in a lateral direction, around the hole, in effect acting like an obstruction to the liquid stream.

SUMMARY OF THE INVENTION

The present invention has as an underlying objective the improvement in the heretofore-known types of corrugated packing elements by the provision of structures within the packing elements that increase the efficiency of the elements, minimizing the amount of liquid that is necessary in order to maximize the wetted area, while also enabling a better mixing of the two fluid phases.

These goals are inventively achieved by providing regular arrays of two different notch designs across the surface of each corrugated layer. Each of the notch designs creates a different type of gill-like opening in the layers, a "W" opening and a "V" opening. The arrays are arranged such that each of these openings is located in a specific area on the layer with respect to the folds or corrugations on the packing element layer surfaces. All of the "W"-shaped gills are located on one side adjacent the fold or ridge, with all of the "V"-shaped gills located adjacent the fold or ridge on the opposite side. At all times, the "W" gills and the "V" gills form arrays that are separated from one another by the fold or corrugation, whether by a ridge or by a trough.

Each type of gill performs a separate function, and it is in fact the function that dictates their respective placement on the folded surface. As was the case with the previously known corrugated packing elements, the folds or corrugations of the individual plates are arranged at an angle to the column axis, when in operation—typically 45°, so that the opposed corrugations of adjacent plates are perpendicular to one another. The "W" gills are placed on the corrugated layers immediately downstream of each fold, whether a trough or a ridge, and the "V" gills are located immediately upstream of each fold. In this manner, liquid flowing down the packing element will always be flowing away from the "W" gill and towards the "V" gill on the surfaces between the troughs and ridges.

When placed in the context of the corrugated layer, the foregoing arrangement of the "W" and "V" gills enables these gills to cooperate in a surprising and unexpected manner. A liquid flowing down a first or outer corrugated layer will first interact with the "W" gills. The "W" notch is formed with two adjacent "V"-shaped prongs (forming the "W") bent downwardly, thereby projecting below the corrugated layer. Any liquid flowing down these projections or prongs will form a liquid drop at the tip of each projection. A continued flow of liquid will cause the drop to break away, and thus the "W" gill forms two adjacent drip points. The liquid droplets fall from the projecting tip and impact against a lower surface of the same corrugated layer. However, by passing through the "W" gill, the liquid is now impacting upon and wetting a second or inner surface of that same corrugated layer.

The liquid not passing through the "W" gills, or that liquid that is dropping down upon the surface but below the W-gills from drip points formed by "W" gills, in a surface located thereabove, flows away from the "W" gills due to gravity and towards the "V" gills located adjacent to the corrugated ridge. The "V" gills consist of a single prong bent downwardly in a similar manner to the "W" gill. Liquid flowing through the "V" gill emerges on the opposite or inner surface of the corrugated layer, substantially adjacent to the "W" gills for that second lower surface. Thereupon, a portion of the liquid will pass through the second set of "W" gills, again to emerge and drop this time to an outer surface of the corrugated layer. In this manner, liquid flows through a "W" gill, drops to an inner, lower surface of the same corrugated layer, flows down to and passes through a "V" gill, which brings it back to an outer surface, and then through a "W" gill, continuing this zig-zag course through the packing element. Since the "W" and "V" gills alternate at each ridge and trough, this back-and-forth pattern is established on both the inner and outer surfaces, effectively maximizing the fluid-wetting of the inner and outer surfaces.

The drop points provided by the "W" gills enhance the wetting of the lower surface in addition to providing a mechanical mixing action due to the impact of the droplets on the lower surface. In addition, the "W" gills also provide an opening for the passage of the gas introduced at the bottom of the packing element, as it flows towards the upper portion of the packing element when in counter-current flow.

The liquid openings provided by the "V" gills lessen the tendency for the liquid to "channel" along the ridge, an effect, that greatly reduces the efficiency of the packing element. In addition, as was the case with the "W" gills, the openings of the "V" gill provide for enhanced mixing of the gas and liquid phases over the corrugated packing previously used. The introduction and even distribution of the two phases is always a concern when utilizing a counter-current process, and the additional mixing of the gas and liquid provided by the "W" and "V" gills tends to lessen the problems that arise because of distributional problems of the two phases.

Various other objects, advantages and features of the present invention will become readily apparent from the ensuing detailed description, and the novel features will be particularly pointed out in the appended claims.

BRIEF DESCRIPTION OF THE DRAWINGS

FIG. 4 is a partial perspective view of a single packing element layer, similar to that shown in plan view, in FIG. 3;

FIG. 5 is a side elevational view, in section, taken substantially along the line 5—5 of FIG. 3, showing the "W" notch or gill opening according to the present invention;

FIG. 6 is a partial perspective view showing a single packing element layer, similar to that shown in FIGS. 3 and 4, as a corrugated or folded construction according to the present invention;

FIG. 7 is a partial perspective view, similar to FIG. 6, showing an alternate notch or gill construction according to the present invention; and FIG. 8 is a partial top plan view showing a "W" notch formed on a single packing element layer prior to bending the punched-out sections from the plane containing the packing layer, in order to complete the "W" notch according to the present invention.

DESCRIPTION OF THE PREFERRED EMBODIMENT

Figure 1:
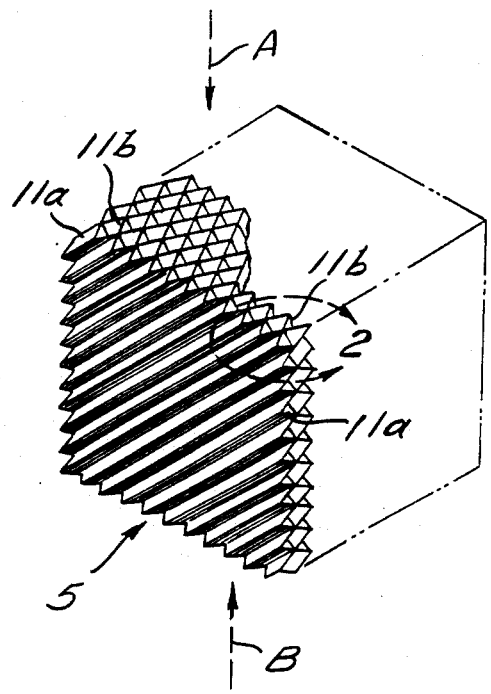
FIG. 1 is a perspective view, with portions in phantom, showing a packing element according to the present invention.

FIG. 1 shows a packing element 5 of the type used in a variety of chemical processes involving two or more fluid flow-streams, with the interaction between the fluids most frequently in cross- or counter-flow. The packing element 5 is constructed from a plurality of individual corrugated plates 11, with the individual unit or cell pattern of the packing element 5 created by a pair of the corrugated plates 11, identified in FIG. 1 by reference numerals 11a and 11b. This pair of corrugated plates 11a, 11b has been identified merely for purposes of explaining the structure and operating principals of the packing element 5, and there is no particular difference between any of the corrugated plate-pairs formed by the plurality of corrugated plates 11 that make up the packing element 5.

As shown in FIG. 1, the packing element 5 is a block-like construction, and this shape is, of course, entirely a matter of design choice. The packing element 5 is formed from a number of corrugated plates 11 of a preselected geometric shape, and is designed to be placed in a column or a tower (neither shown) in a manner permitting the cooperation between adjacent blocks or shaped constructions of packing elements 5 to ensure an unrestricted passage of a fluid A in the direction shown by the arrows in FIG. 1 and the passage of fluid B in the direction of the arrows adjacent to reference letter B in FIG. 1. Both sets of arrows in FIG. 1 indicate a counter-current flow relationship between the fluids A and B. This relationship is only by way of example and not by way of limitation. Within the packing element 5, the construction of the passageways for the two fluids A, B are best shown in FIG. 2.

The corrugated or folded plates 11 sequentially provide a plurality of troughs 14 and a plurality of ridges 16, with a surface area of the plate 11 separating the troughs 14 and the ridges 16. When the pair of corrugated plates 11a, 11b are in juxtaposition, as shown in FIG. 2, the ridges 16a of the first corrugated plate, 11a, abut the troughs 14b of a second corrugated plate, 11b. As shown in FIG. 2, the second corrugated plate 11b has been rotated 90° from a superimposed position over the first corrugated plate 11a. The precise amount of rotation also does not constitute the present invention, but is preferably near 90°. Within this spatial relationship, the troughs 14b and the ridges 16b of the second corrugated plate 11b are aligned with a first axis C shown in FIG. 2 and the troughs 14a and ridges 16a of the first corrugated plate 11a are aligned with a second axis D. The first and second axes C, D are perpendicular to one another in FIG. 2, indicating a 90° rotation of the corrugated plates 11a, 11b.

The alternating sequence of the troughs 14 and the ridges 16 as between any pair of adjacent corrugated plates 11a, 11b forms a series of passageways 18a, 18b suitable for receiving and directing the flow of fluids through the packing element 5. Although there is no structural barrier between the adjacent pair of corrugated plates 11a, 11b, the 90° rotation between the adjacent corrugated plates 11a, 11b substantially isolates the flow-streams in the respective passageways 18a, 18b. This is of course a desirable feature, since thereby the surfaces of both of the corrugated plates 11a, 11b are fully utilized in the mass transfer and/or heat exchange process.

Figure 2:
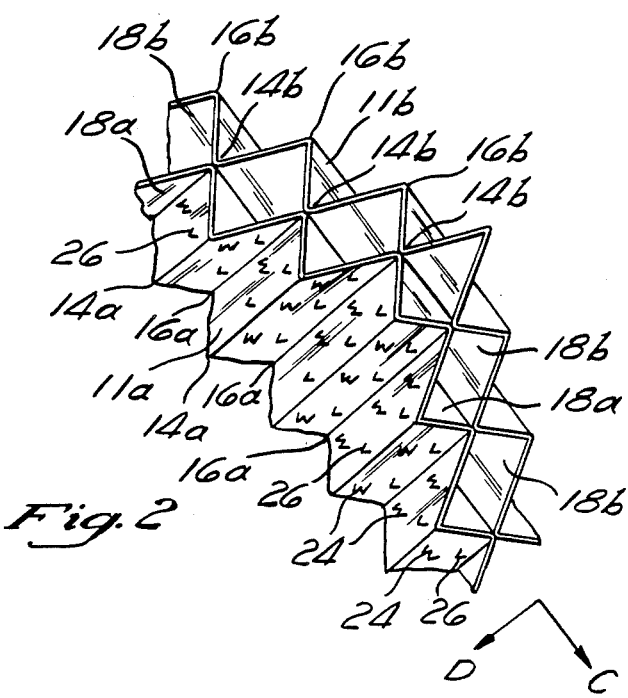
FIG. 2 is a partial perspective view showing that portion of the packing element substantially within the circle -2- in FIG. 1.

Although not shown in FIG. 2 for the sake of clarity, all of the corrugated plates 11 of the packing element 5 are provided with two different types of notches, a W-notch 24 and a V-notch 26, in the surface thereof. The W-notches 24 and the V-notches 26 are formed in specific locations on the corrugated plates 11 with respect to the positions of the troughs 14 and the ridges 16. For each portion of the corrugated plate 11 separating the troughs 14 and the ridges 16, the W-notches 24 will form a linear, parallel array adjacent to the troughs 14 and the ridges 16. A similar linear array is formed by the V-notches 26 formed adjacent to the W-notches 26 but separated therefrom by the troughs 14 or the ridges 16. The arrays of W-notches 24 and the V-notches 26 thus alternate across the surface of the corrugated plates 11 in a regularly spaced manner. The location of this entire pattern is determined by the operating orientation of the packing element 5. To ensure proper operation of the packing element 5, it is necessary that with respect to each surface of the corrugated plates 11 between the troughs 14 and the ridges 16, the W-notches 24 lie upstream of the V-notches 26, whereby upon introducing a liquid fluid (such as A in FIG. 1), the fluid will flow from the W-notch 24 towards the V-notch 26. As will be described later, this arrangement is required in order to obtain the desired liquid flow-path on the corrugated plates 11.

Figure 3:
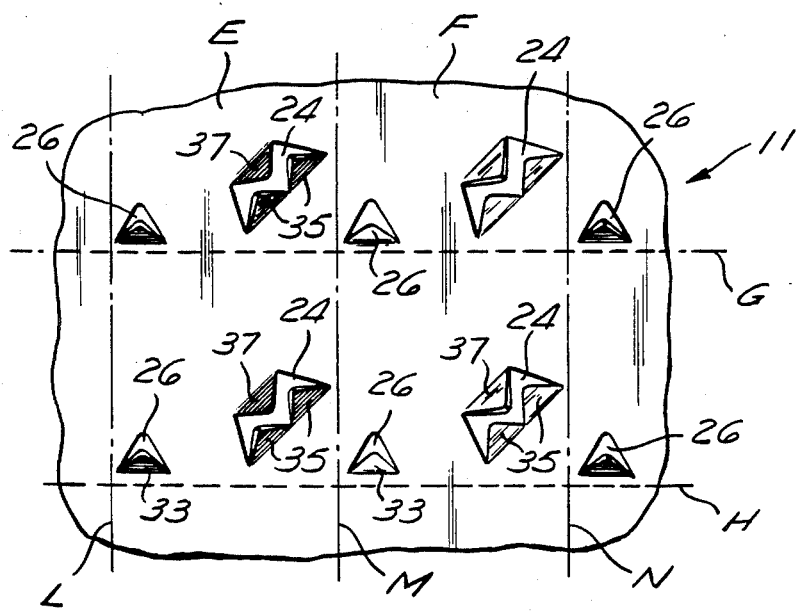
FIG. 3 is a partial top plan view of a single packing element layer according to the present invention with broken lines indicating the corrugation or fold lines for this layer and for the layer located immediately adjacent, either below or above, (not shown)

As shown in FIG. 3, the W-notches 24 and the V-notches 26 alternate in a regular array across the surface of the corrugated plates 11, with their respective positions fixed about a sequence of three fold lines L, M, N. The corrugated plates 11 are most preferably manufactured from sheet metal and the w- and V-notches are constructed by a stamping operation wherein either a v- or W-shaped cut is made in the sheet metal forming either a single prong 33 or a double prong 35, respectively. The prongs 33,35 are subsequently bent out of the plane containing the corrugated plate 11, the direction of bending being dependent upon achieving the desired liquid flow-path in the completed construction. The zig-zag pattern of the corrugated plate 11 causes the bending direction of the prongs 33,35 to form an alternating pattern across the surface of the corrugated plates 11. For example, in the section of the corrugated plate 11 shown in FIG. 3, a first segment E of the corrugated plate 11 formed between the first fold line L and the second fold line M have the prongs 33,35 bent out of the surface of the plane containing the corrugated plate 11. In contrast, a second segment F of the corrugated plate 11, formed between the second fold line M and the third fold line N, has the prongs 33,35 bent inwardly from the plane containing the corrugated plate 11. This pattern continues throughout the corrugated plate 11 and is necessary to obtain the proper liquid flow-path through the packing element 5.

In the fabrication of the W-notch 24, a center prong 37 is formed between the double prongs 35. As shown in FIG. 3, the center prong may remain in the plane of the corrugated plates 11, however, as shown in FIG. 4, the center prong 37 may also be displaced out of the plane of the corrugated plate 11, in an opposite direction from that of the double prongs 35. The displacement of the center prong 37 is typically a result of the manufacturing process for bending the double prongs 35 and no significant additional advantage is believed obtained by the bending of the center prong 37. The respective bending between the center prong 37 and the double prong 35 is also shown in FIG. 5.

Folding of the corrugated plate 11 about the three fold lines L, M, N produces the corrugated plate 11 in its operational form as shown in FIG. 6. The folded or corrugated surface of the corrugated plate 11 in effect creates a series of individual surfaces separated by the troughs and ridges, and in FIG. 6, these are noted by a first flow surface 42, a second flow surface 44, a third flow surface 46 and a fourth flow surface 48. Moreover, the corrugated plate 11 according to the present invention provides both an inner and an outer flow surface, which will be indicated on FIG. 6 by reference letters "a" and "b". The path of a liquid flow stream R is shown in FIG. 6 first impacting upon the first flow surface 42a, flowing thrugh a first V-notch 26', being directed by the prong or fluid directional member 33, thereafter falling upon the inner, second flow surfaced 44b. The flow-stream R continues flowing along the second inner surface 44b until reaching a first W-notch 24'. A portion of the liquid flow stream R flows down each of the double prongs 35, each of which form drip points at the tips thereof, with the flow-stream R dropping from the ends of the double prongs 35, falling onto a third flow surface 46a, there-below. The flow-stream R continues by flowing through a second V-notch 26", falling to an underlying inner fourth flow surface 48b, with a portion thereafter flowing through a second W-notch 24", and then dropping from the double prongs thereof onto yet another surface of the corrugated plate 11, not shown. Although not shown in FIG. 6 for the sake of clarity, a second liquid flow-stream is formed using primarily the inner flow surfaces 44b, 46a, 48b and making use of an analogous grouping of related w- and V-notches 24,26.

The combination of both liquid flow streams maximizes the wetted surface area for the corrugated plate 11. Passages for the second fluid, not shown, typically a gas, are formed primarily by the troughs 14, although some air advantageously passes through both the w- and V-notches 24,26. In addition, since a liquid flow stream is simultaneously passing through the w- and the V-notches 24,26, the passage of the second fluid therethrough creates additional opportunities for intermixing. In order to provide larger passageways for the intermixing of the two fluid streams, it is possible to form a compound W-notch 53, shown in FIG. 7, having a second pair of double prongs 55 bent in an opposite manner from the first double prongs 35. This manner of construction increases the amount of air flow through the compound W-notch 53 from that of the previous construction, increasing the intermixing of the two fluid streams.

While I have disclosed an exemplary structure to illustrate the principles of the present invention, it should be understood that I wish to embody within the scope of the present patent warranted hereon, all such modifications as reasonably and properly come within the scope of my contribution to the art.

What is claimed is:

1. An improved packing element for placing within an exchange column of the type consisting of a plurality of parallel, adjacent corrugated plates, the corrugations between adjacent plates lying in an abutting, non-parallel relation, wherein the improvement comprises:
   a plurality of first notches formed on multiple surfaces on each of said corrugated plates, said multiple surfaces formed on said corrugated plates between a plurality of ridges and a plurality of adjacent troughs thereof; and a plurality of second notches formed on said multiple surfaces and cooperating with said plurality of first notches to form a fluid flow stream path within a plurality of the individual corrugated plates, said first notches comprise in combination, W-shaped openings in said corrugated plate and a pair of drip points adjacent to and in fluid communication with said W-shaped openings, and said second notches comprise in combination V-shaped openings in said corrugated plate and a fluid directional member adjacent to and in fluid communication therewith, whereby said first and said second notches effect an enhanced uniform distribution of a downwardly flowing fluid through the packing element.

2. An improved packing element as described in claim 1, wherein said first notches and said second notches each form separate linear arrays on said multiple surfaces, said first notch linear array upstream with respect to said second notch linear array on each of said multiple surfaces of the corrugated plate.

3. A packing element for use in an exchange column comprising:

a plurality of corrugated plates placed adjacent to and parallel with one another, the corrugations of each of said plates forming a non-parallel relationship with the corrugations of an adjacent plate and with a vertical axis of the exchange columns each of said plates having a plurality of first W-shaped, notches and a plurality of second, V-shaped notches formed therein, with a first linear array of said first, W-shaped notches and a second linear array of said second, V-shaped notches provided on a surface of the corrugated plate between a ridge and a trough thereof, said first and second linear arrays comprising a sequential pair of linear arrays on each of said surfaces, with at least one sequential pair of linear arrays located on a plurality of the surfaces of the corrugated plate lying between the ridges and the troughs thereof.

said W-shaped and said V-shaped notches sized and located on said plate in a manner permitting fluid communication between adjacent corrugated surfaces of said plate when placed within said exchange column, whereby said first and second notches effect enhanced mass transfer and heat exchange rates within the packing elements.

4. A packing element for use in an exchange column as described in claim 1, wherein said W-shaped notches each comprise a W-shaped opening formed in said corrugated plate, having a pair of drip points formed adjacent and in fluid communication with said W-shaped opening, whereby a plurality of drip points are formed on the corrugated plate, receiving that portion of a fluid flow stream within the packing element flowing through the W-shaped opening.

5. A packing element for use in an exchange column as described in claim 4, wherein said V-shaped notches each comprise a V-shaped opening formed in said corrugated plate having at least one fluid directional member adjacent to and in fluid communication with said V-shaped opening, whereby a portion of the fluid flow stream within the packing element is received by the V-shaped opening and is directed by the fluid directional member.

6. A packing element for use in an exchange column as described in claim 5, wherein said W-shaped opening is at least 2 millimeters in width.

7. A packing element for use in an exchange column comprising:

a plurality of corrugated plates placed adjacent to and parallel with one another, the corrugations of each of said plates forming a non-parallel relationship with the corrugations of an adjacent plate and with a vertical axis of the exchange column, each of said plates having a plurality of first notches and a plurality of second notches formed therein, said first notches each comprise a W-shaped opening formed in said corrugated plate, having a pair of drip points formed adjacent and in fluid communication with said W-shaped opening, and said second notches each comprise a V-shaped opening formed in said corrugated plate having at least one fluid directional member adjacent to and in fluid communication with said V-shaped opening, with said plurality of W-shaped openings and said plurality of V-shaped openings formed on a surface of said corrugated plate in an alternating manner, and with respect to a fluid flowing through said packing element, said W-shaped openings are located upstream of said V-shaped openings on each surface formed on said corrugated plate between a ridge and a trough thereof, whereby a portion of the fluid passes first through a W-shaped opening, with the V-shaped opening on said same surface receiving the remaining fluid, in addition to receiving that amount of fluid dripping onto said same surface from a W-shaped opening formed on said corrugated plate in a surface overlying said same surface.

* * * * *